(12) United States Patent
Mitchell, Jr. et al.

(10) Patent No.: US 10,104,528 B2
(45) Date of Patent: Oct. 16, 2018

(54) SUPPLEMENTAL LOCATION INFORMATION FOR AN EMERGENCY SERVICES CALL

(71) Applicants: Donald L. Mitchell, Jr., Bellevue, WA (US); Roger S. Marshall, Auburn, WA (US); Victor C. Burton, Bellevue, WA (US); Matthew B. Davis, St. Johnsbury, VT (US); Jeffrey T. Martin, Longmont, CO (US)

(72) Inventors: Donald L. Mitchell, Jr., Bellevue, WA (US); Roger S. Marshall, Auburn, WA (US); Victor C. Burton, Bellevue, WA (US); Matthew B. Davis, St. Johnsbury, VT (US); Jeffrey T. Martin, Longmont, CO (US)

(73) Assignee: TELECOMMUNICATION SYSTEMS, INC., Annapolis, MD (US)

( * ) Notice: Subject to any disclaimer, the term of this patent is extended or adjusted under 35 U.S.C. 154(b) by 0 days.

(21) Appl. No.: 15/656,615

(22) Filed: Jul. 21, 2017

(65) Prior Publication Data

US 2018/0220275 A1    Aug. 2, 2018

Related U.S. Application Data

(60) Provisional application No. 62/453,267, filed on Feb. 1, 2017.

(51) Int. Cl.
*H04M 11/04* (2006.01)
*H04W 4/90* (2018.01)
*H04W 4/02* (2018.01)

(52) U.S. Cl.
CPC .............. *H04W 4/90* (2018.02); *H04W 4/023* (2013.01)

(58) Field of Classification Search
CPC ................................ H04W 4/90; H04W 4/023
See application file for complete search history.

(56) References Cited

U.S. PATENT DOCUMENTS

| | | | |
|---|---|---|---|
| 6,477,292 B1 | 11/2002 | Takahashi | |
| 8,484,352 B2 | 7/2013 | Piett et al. | |
| 9,094,535 B2 | 7/2015 | Boni et al. | |
| 9,148,771 B2 | 9/2015 | Zetner et al. | |
| 9,179,280 B2* | 11/2015 | Ray | H04M 3/5116 |
| 2008/0045250 A1* | 2/2008 | Hwang | H04W 4/14 |
| | | | 455/466 |
| 2008/0304631 A1 | 12/2008 | Vilis et al. | |

(Continued)

*Primary Examiner* — Wayne H Cai
(74) *Attorney, Agent, or Firm* — Tarolli, Sundheim, Covell & Tummino LLP

(57) ABSTRACT

An emergency gateway can receive carrier location information from a carrier location server for an end-user device that initiated an emergency services call. The emergency gateway can also receive supplemental location information for the end-user device from a supplemental location server and select one of the carrier location information and the supplemental location information. The emergency gateway can generate routing information for the emergency services call based on the selected location information, wherein the routing information identifies a given Public Safety Answering Point (PSAP) for the emergency services call. Further, the emergency gateway can route the emergency services call to the given PSAP based on the routing information.

19 Claims, 5 Drawing Sheets

(56) References Cited

U.S. PATENT DOCUMENTS

| | | |
|---|---|---|
| 2011/0064205 A1 | 3/2011 | Boni et al. |
| 2011/0289220 A1 | 11/2011 | Henson |
| 2012/0250677 A1* | 10/2012 | Beason ................ H04M 7/006 |
| | | 370/352 |
| 2014/0294161 A1 | 10/2014 | O'Connor et al. |
| 2015/0229766 A1 | 8/2015 | Herron, Jr. et al. |
| 2016/0057287 A1* | 2/2016 | Mitchell ................ H04L 12/66 |
| | | 370/328 |
| 2016/0192167 A1* | 6/2016 | Piett ........................ H04W 4/22 |
| | | 455/404.2 |
| 2016/0275151 A1* | 9/2016 | Lovati .................... G06Q 10/06 |
| 2017/0041963 A1* | 2/2017 | Edge .................. H04W 76/007 |

\* cited by examiner

SUPPLEMENTAL LOCATION INFORMATION FOR AN EMERGENCY SERVICES CALL

CROSS-REFERENCE TO RELATED APPLICATION

This application claims the benefit of priority to U.S. Provisional Application No. 62/453,267, filed on 1 Feb. 2017 the entirety of which is herein incorporated by reference.

TECHNICAL FIELD

This disclosure relates to location information for an emergency services call.

BACKGROUND

"9-1-1" (or "911") is an emergency telephone number for the North American Numbering Plan (NANP), one of eight N11 codes. In North American jurisdictions, special privacy legislation permits emergency operators to obtain a 9-1-1 caller's telephone number and location information. This information is gathered by mapping the calling phone number to an address in a database. This database function is known a location data source. The database is generally maintained by the local telephone company, under a contract with a Public Service Answering Point (PSAP). Each telephone company has standards for the formatting of the database. The A could be implemented, for example, by an Automatic Location Information (ALI) service, a location database, a location information server with a data repository, etc.

A PSAP, sometimes referred to as a Public Safety Answering Point, is a call center responsible for answering calls to an emergency telephone number for police, firefighting and ambulance services. Trained telephone operators may also be responsible for dispatching these emergency services. Most PSAPs are capable of caller location for landline calls, and many can handle mobile phone locations as well (sometimes referred to as phase II location), where the mobile phone company has a handset location system. As used herein, the term PSAP can alternatively refer to an Emergency Call Center (ECC) a term employed for Voice over Internet Protocol (VoIP) systems.

Next Generation 9-1-1 (abbreviated "NG9-1-1") refers to an initiative by the National Emergency Number Association (NENA) aimed at updating the 9-1-1 service infrastructure in the United States and Canada to improve public emergency communications services in a growingly wireless mobile society. In addition to calling 9-1-1 from a mobile phone, NG9-1-1 intends to enable the public to transmit text, images, video and data to the PSAP. The NG9-1-1 initiative also envisions additional types of emergency communications and data transfer. The NG9-1-1 infrastructure is intended to replace the current emergency network services over time.

SUMMARY

One example relates to an emergency gateway that can receive carrier location information from a carrier location server for an end-user device that initiated an emergency services call. The emergency gateway can also receive supplemental location information for the end-user device from a supplemental location server and select one of the carrier location information and the supplemental location information. The emergency gateway can generate routing information for the emergency services call based on the selected location information, wherein the routing information identifies a given Public Safety Answering Point (PSAP) for the emergency services call. Further, the emergency gateway can route the emergency services call to the given PSAP based on the routing information.

Another example relates to a system that includes an emergency gateway comprising one or more computing devices that queries a carrier location server for carrier location information for the end-user device response to receiving an emergency services call initiated by a caller employing an end-user device, wherein the carrier location information characterizes a cell sector for the end-user device. The emergency gateway can also queries a supplemental location server for supplemental location information for the end-user device, wherein the supplemental location characterizes geographical coordinates of the end-user device and a precision of the supplemental location information. Further, the emergency gateway selects one of the carrier location information and the supplemental location information. Additionally, the emergency gateway determines routing information for the emergency services call based on the selected location information, wherein the routing information identifies a given Public Safety Answering Point (PSAP) and forwards the emergency services call to the given PSAP.

Still another example relates to a method that includes receiving an emergency services call by an end-user device from a primary service delivery node (PSDN) of the end-user device and querying a carrier location server for carrier location information for the end-user device. The method also includes querying a supplemental location server for supplemental location information for the end-user device and selecting one of the carrier location information and the supplemental location information for the emergency services call based on an accuracy and precision of each of the carrier location information and the supplemental location information.

DETAILED DESCRIPTION

Wireless 9-1-1 calls are routed by location of the caller in order to achieve Next Generation 9-1-1 ("NG9-1-1") standards and to reduce the amount of transfers because of the current deterministic routing technique. Conventionally, carrier networks employ systems such as global navigation satellite systems (GNSSs) and non-GNSS systems (e.g., terrestrial positioning systems) to calculate the location of a handset that initiated the 9-1-1 call. This calculation of location may not be as precise as location information from another (third party) source.

To improve the routing for an emergency services call (e.g., to meet standards set forth in NG9-1-1), an emergency gateway described herein retrieves supplemental location information from one or more supplemental location servers. Moreover, the emergency gateway selects either the carrier location information or the supplemental location information. The emergency gateway employs the selected location information to identify routing information for a particular Public Safety Answering Point (PSAP) to handle the emergency services call.

Supplemental location information provided from the one or more supplemental location servers is potentially more current, more accurate and/or more precise than (legacy) carrier location systems, such as Serving Mobile Location Center (SMLC) and/or Positioning Determining Entity (PDE) location systems. Thus, employing the supplemental location information improves the accuracy in selecting the PSAP to service the emergency services call. Moreover, the present systems and methods are location technology agnostic. Thus, as new location technologies from third parties emerge, the systems and methods described herein can leverage these emerging technologies without requiring significant change to the emergency services infrastructure.

Figure 1:
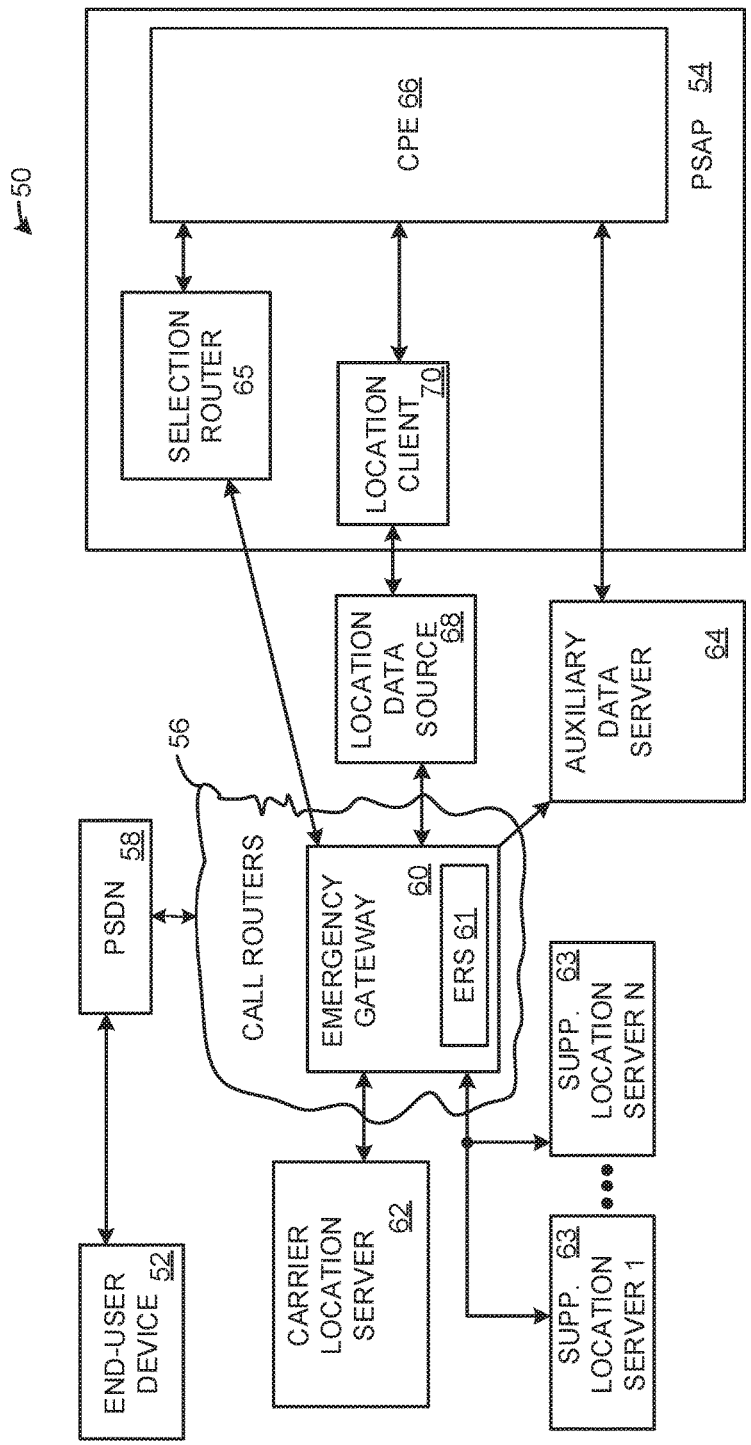
FIG. 1 illustrates an example of a system configured to process an emergency services call.

FIG. 1 illustrates an example of a system 50 configured to facilitate the processing of emergency service calls. Communication between nodes of the network can be conducted via a private network (e.g., a wireless carrier network), a public network (e.g., the Internet), or a combination thereof. The system 50 can include an end-user device 52 operated by an end-user, which end-user can be referred to as a caller. The end-user device 52 can be a mobile device, such as a wireless phone (e.g., a smart phone, a feature phone, etc.), Voice over Internet Protocol (VoIP) phone, etc.

The end-user device 52 can be employed by the caller to initiate an emergency services call. The emergency services call can be, for example, a voice 9-1-1 call, a 9-1-1 text (or short) message (e.g., a short message service (SMS) message or a real-time text (RTT) message), etc. The emergency services call can be a request for immediate emergency assistance, including ambulatory service, police assistance, fire department assistance, assistance on waterways or some combination thereof. In some examples, the end-user device 52 may be issued or controlled by a particular enterprise (e.g., a business) that maintains its own call center (e.g., a secondary call center) for handling emergency service calls.

The emergency services call can be routed to a particular PSAP 54 via call routers 56 in a manner described herein. In particular, the end-user device 52 can be connected to a primary service delivery node (PSDN) 58. In examples where the end-user device 52 is a mobile phone operating on a carrier network, the PSDN 54 can be implemented as a Mobile Switching Center (MSC) 58. In examples where the end-user device is a VoIP phone, the PSDN 58 can be implemented as a VoIP service provider (VSP). The PSDN 58 can be connected to the call routers 56. The call routers 56 can be representative of a collection of telephony routers, including, but not limited to a cell tower, selective routers, etc. The call routers 56 can be implemented as part of the Public Switched Telephone Network (PSTN), the Internet and/or as part of a private network (e.g., a wireless carrier network).

The PSDN 58 can route/transfer e emergency services call to an emergency gateway 60 of the call routers 56. The emergency gateway 60 can be configured as a router (e.g., a hardware device). In some examples, the emergency gateway 60 can be implemented as a distributed computing device (e.g., an instance of virtual hardware) executing in a computing cloud. In other examples, the emergency gateway 60 can be implemented as a single instance of hardware. The emergency gateway 60 can include the functionality and/or structure of a positioning center, which can be referred to as an emergency routing services (ERS) node 61. The ERS 61 of the emergency gateway 60 can include the functionality of be representative of nearly any non-landline positioning center, including NG9-1-1 Core Services (NGCS) node and/or a transitional NG9-1-1 gateway and an Emergency Services Network (ESInet) node. It is also noted that in some examples, the ERS 61 and the emergency gateway 60 can be implemented on separate computing devices that communicate with each other.

In some examples, such as situations where the emergency services call is a text message, the notification can include pictures, video and/or audio, which can collectively be referred to as auxiliary data. In such a situation, the notification of the emergency services call can include the auxiliary data.

In response to receipt of the emergency services call, the emergency gateway 60 can be configured to determine routing information for the emergency services call. The emergency gateway 60 can be configured to communicate with a carrier location server 62, such as a 9-1-1 location server. The carrier location server 62 can be configured to determine carrier location information for the end-user device 52. The carrier location server 62 is operated/controlled by a carrier network, such as a wireless network or by a infrastructure service provider (ISP). The carrier location server 62 can be implemented as a Serving Mobile Location Center (SMLC) and/or Positioning Determining Entity (PDE) location system. In some examples, the carrier location information of the end-user device 52 can be geographic coordinates (e.g., latitude and longitude coordinates) that can be determined from a query to the end-user device 52. In other examples, the carrier location information of the end-user device 52 can be derived from identification of a plurality of base stations (cell towers) communicating with the end-user device 52 via triangulation. Alternatively, the carrier location information can be a cell sector (Cell-ID) of a cell tower communicating with the end-user device 52. In still other examples, the carrier location information can be a civic address (street address) associated with the end-user device 52. The carrier location information can be returned to the emergency gateway 60. In some examples, the carrier location information can have an associated precision (error radius) associated with a location (e.g., +/−500 meters) and/or a timestamp. The emergency gateway 60 can store the carrier location information in a database that is associated with the emergency services call.

The emergency gateway 60 can also query N number of supplemental location servers 63, where N is an integer greater than or equal to one. Each of the supplemental location servers 63 are implemented by third party location services that provide location data that may or may not be more accurate, more precise and/or more current (more recent) than the carrier location information provided from the carrier location server 62.

As one example, a given one of the N number of supplemental location servers 63 could be implemented as an enterprise location system that includes a database with location information for the end-user device 52. For instance, in such an example, the enterprise location server could track end-user devices (including the end-user device 52) based on a location of Wi-Fi routers or Bluetooth hotspots that communicate with the end-user devices. In some examples, a given one of the N number of supplemental location servers 63 can employ hybrid location technology that employs multiple location technologies to determine location information. Such hybrid location technology can include, but is not limited to a combination of information from Wi-Fi routers and Bluetooth hotspots. In another example, a given one of the N number of supplemental location servers 63 could be configured to retrieve handset-based location. In such a situation, the given supplemental location server 63 could be configured to query the end-user device 52 for a current location. In this situation, in response, the end-user device 52 can determine a current location (e.g., based on GNNS or carrier signals) and return the determined location back to the given supplemental location server 63.

In yet another example, a given one of the N number of supplemental location servers 63 could store periodic updates to location that are provided from end-user devices, including the end-user device 52. For instance, in such a situation, the given supplemental location server 63 could be connected to a server providing service to a client executing on the end-user device 52, and the end-user device 52 periodically determines a current location and provides updated location information to the given supplemental location server 63. As some examples of commercially available systems, a given one of the N number of supplemental location servers 63 could be a RapidSOS™ server, a Laaser™ server, etc. Moreover, the specific descriptions for the N number of supplemental location servers 63 is not meant to be exhaustive. Nearly any location technology can be employed by the N number of supplemental location servers 63, and the system 50 is designed to be agnostic to the particular type of location technology employed to determine the location of the end-user device 52.

Each of the N number of supplemental location servers 63 (or some subset thereof) can return supplemental location information for the end-user device 52 to the emergency gateway 60. The supplemental location information can include a location such as geographic coordinates, a cell sector, a civic address, etc. Additionally, the supplemental location information can, in some examples, include a precision (error radius) and/or a timestamp. Additionally or alternatively, in some examples, the emergency gateway 60 may assign a precision to the supplemental location information based on past performance and/or on the type of technology employed at the corresponding supplemental location server 63.

Upon receipt of the carrier location information from the carrier location server 62 and the supplemental location information from the N number of supplemental location servers 63, the emergency gateway 60 can select location information from amongst the carrier location and the N number of instances of supplemental location.

In some examples, to determine the selected location information, the emergency gateway 60 can be configured/programmed to evaluate an accuracy and precision of the carrier location information and each instance of the supplemental location information. For example, the emergency gateway 60 can be configured to presume that the carrier location information is accurate and is as precise as the associated or assigned precision information indicates. Additionally, the emergency gateway 60 can evaluate the accuracy and precision of each instance of supplemental location information based on the location identified in the carrier location information and associated precision. For example, the emergency gateway 60 can evaluate the location identified in a given instance of supplemental location information to determine if such a location is encompassed within (e.g., inside) an area identified in the carrier information. Additionally or alternatively, the emergency gateway 60 can compare a portion of area identified in the supplemental location information that does not overlap the area identified in the carrier location information to compare the accuracy and precision of the supplemental location information and the carrier location information. FIGS. 2-5 demonstrate these concepts.

Figure 2:
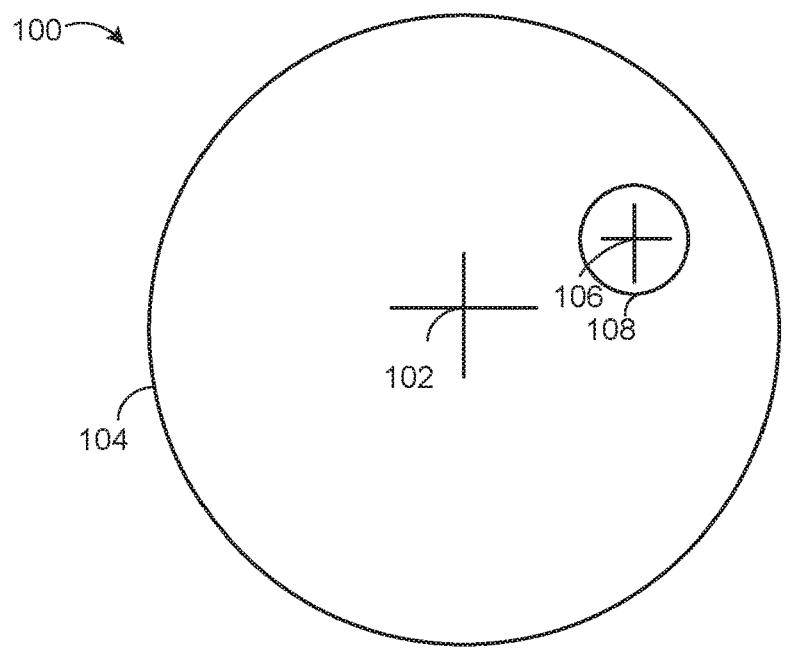
FIG. 2 illustrates a diagram depicting a comparison of carrier location information with supplemental location information.

FIG. 2 illustrates a diagram 100 with carrier location information compared against an instance of supplemental location information. The carrier information identifies a first location 102 that represents geographic coordinates of the carrier location information. Moreover, a first circle 104, with the first location 102 at the first center 102 of the circle represents a precision (error radius) of the carrier location information. In other examples, the first circle 104 could represent a cell sector service region identified in the carrier location information. Thus, it is presumed that the end-user device 52 is within the first circle 104. Additionally, the diagram 100 includes a second location 106 and a second circle 108 that represents the instance of the supplemental location information. As illustrated, in FIG. 2, the supplemental location information is accurate since the second location 106 (of the supplemental location information) is within the first circle 104 (defining the precision of the carrier location information). Additionally, the area encompassed by the second circle 108 is smaller than the area encompassed by the first circle 104, thereby indicating that in the example illustrated in FIG. 2, the supplemental location information is accurate and more precise than the carrier location information.

Figure 3:
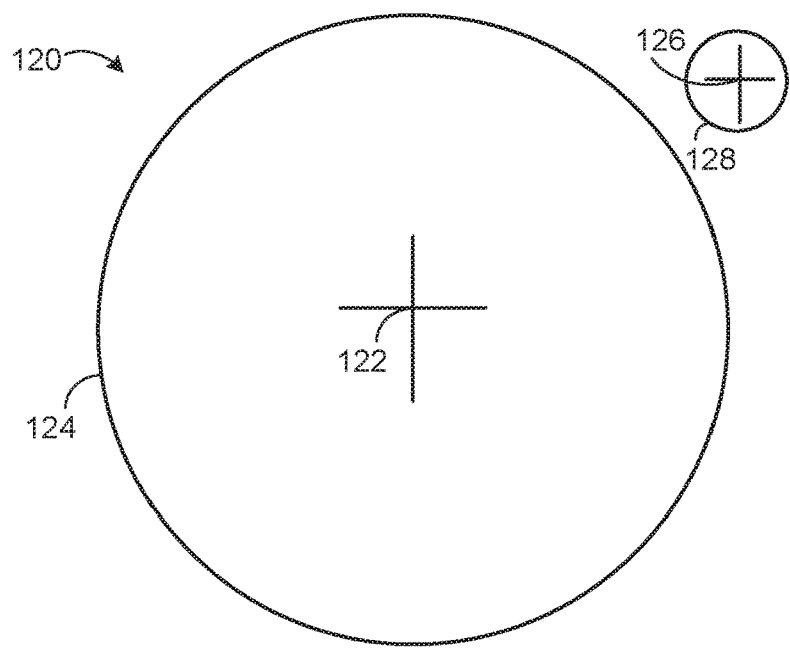
FIG. 3 illustrates another diagram depicting a comparison of carrier location information with supplemental location information.

FIG. 3 illustrates another diagram 120 with carrier location information compared against an instance of supplemental location information. The carrier information identifies a first location 122 that represents geographic coordinates of the carrier location information. Moreover, a first circle 124, with the first location 122 at the center of the first circle 124 represents a precision (error radius) of the carrier location information. Thus, it is presumed that the end-user device 52 is within the first circle 124. Additionally, the diagram 120 includes a second location 126 and a second circle 128 that represents the instance of the supplemental location information. As illustrated, in FIG. 3, the supplemental location information is not accurate since the second location 126 (of the supplemental location information) is outside of the first circle 124 (defining the precision of the carrier location information). Additionally, the area covered by the second circle 128 is smaller than the area covered by the first circle 104, thereby indicating that in the example illustrated in FIG. 3, the supplemental location information is more precise than the carrier location information. However, in this example, since the second location 126 is deemed to be inaccurate, the second location 126 is not selected, even with a greater level of precision than the first location 122.

Figure 4:
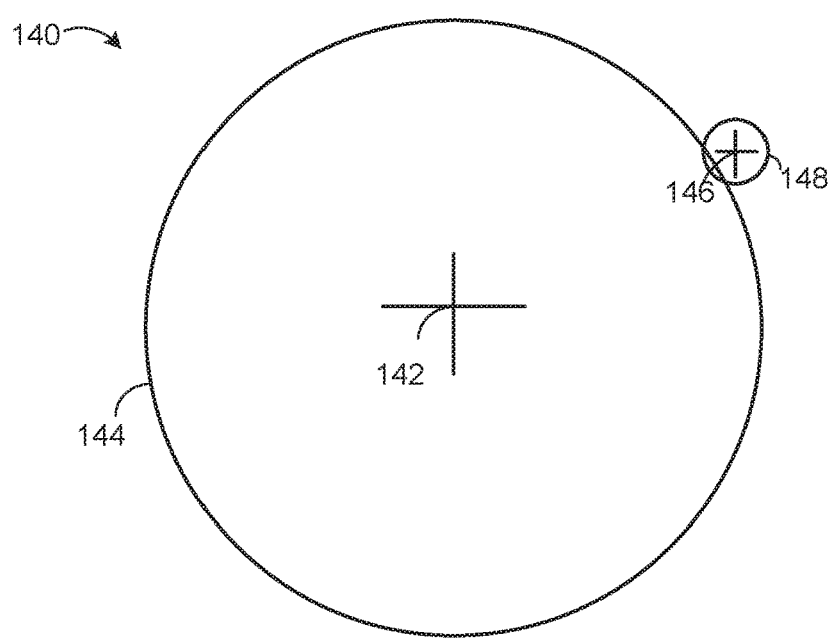
FIG. 4 illustrates yet another diagram depicting a comparison of carrier location information with supplemental location information.

FIG. 4 illustrates yet another diagram 140 with carrier location information compared against an instance of supplemental location information. The carrier information identifies a first location 142 that represents geographic coordinates of the carrier location information. Moreover, a first circle 144, with the first location 142 at the center of the first circle 144 represents a precision (error radius) of the carrier location information. Additionally, the diagram 140 includes a second location 146 and a second circle 148 that represents the instance of the supplemental location information. In FIG. 4, the supplemental location information selected since (i) a portion of the second circle 148 overlaps the first circle 144, and (ii) the portion of the second circle 148 that does not overlap the first circle 144 (defining the precision of the carrier location information) is less than a predetermined threshold (e.g., about 10% or another amount) of the area of the first circle 144.

Figure 5:
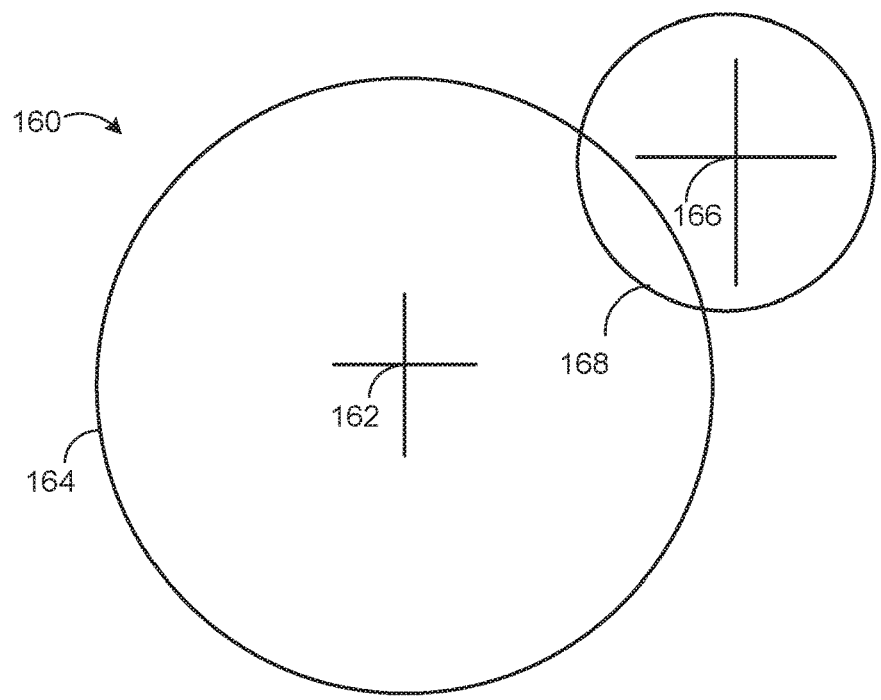
FIG. 5 illustrates still yet another diagram depicting a comparison of carrier location information with supplemental location information.

FIG. 5 illustrates still yet another diagram 160 with carrier location information compared against an instance of supplemental location information. The carrier information identifies a first location 162 that represents geographic coordinates of the carrier location information. Moreover, a first circle 164, with the first location 162 at the center of the first circle 164 represents a precision (error radius) of the carrier location information. Additionally, the diagram 160 includes a second location 166 and a second circle 168 that represents the instance of the supplemental location information. In FIG. 5, the supplemental location information is not selected since a portion of the second circle 168 overlaps the first circle 164, but the portion of the second circle 148 that does not overlap the first circle 164 is greater than a predetermined threshold (e.g., about 10% or another amount) of the area of the first circle 164 (defining the precision of the carrier location information).

The examples described and illustrated with respect to FIGS. 2-5 are not meant to be exhaustive. Machine learning and/or other techniques could additionally or alternatively be employed to compare the accuracy and precision of the carrier location information and the supplemental location information.

Referring back to FIG. 1, additional and/or alternative criteria can be employed to choose the selected location information. For instance, in some examples, timestamps can be evaluated by the emergency gateway 60 to determine the instance of location information (carrier or supplemental location information) that is the most current. The emergency gateway 60 can employ the selected location information to determine the routing information for the emergency services call. The routing information can identify a particular PSAP 54 (or other call center) that can service the emergency services call. The selection of the PSAP 54 can be based, for example, on a geographic location of the end-user device 52 that is characterized in the selected location information.

Additionally, in situations where the emergency services call has associated auxiliary data, the emergency gateway 60 can forward the auxiliary data. In response, the auxiliary data server 64 can store the auxiliary data in a database (or other data structure) that is indexed by an identifier of the emergency services call. In situations where the emergency call includes auxiliary data, the emergency gateway 60 can provide information indicating the auxiliary data has been sent to the auxiliary data server 64 for the emergency services call.

The emergency gateway 60 can forward the emergency services call to the PSAP 54. In some examples, the emergency gateway 60 can add call data and/or fields in packet headers with the emergency services call that indicate the presence of auxiliary data.

The PSAP 54 can include a selection router 65 that can route the emergency services call to an appropriate instance of customer premise equipment (CPE) 66 (e.g., a PSAP operator terminal). The selection router 65 can be implemented, for example, as a private branch exchange (PBX) system. The CPE 66 can be implemented, for example, as a user terminal that implements standard PSAP software. The CPE 66 can be employed by a PSAP operator to establish bi-directional communication (e.g., voice or text) with the caller making the emergency services call. In some examples, the CPE 66 can be implemented as an i3 PSAP system that can support rich data (e.g., multimedia data). In other examples, the CPE 66 can be implemented as a legacy user terminal (e.g., a text only terminal).

The system 50 can include a location data source 68. The location data source 68 can be configured with an interface for the emergency gateway 60. The location data source 68 can be representative of a plurality of computing devices (e.g., a computing cloud) operating in concert to deploy the location data source 68. Alternatively, the location data source 68 can be implemented with a single server. The location data source 68 could be implemented, for example, as an Automatic Location Information (ALI) service, a location database, a location information service with an additional data repository, etc. However, this list is not meant to be exhaustive. It is to be appreciated that other types systems to implement the location data source could be employed as new location technologies emerge.

The emergency services call routed to the CPE 66 can include an identifier that can (at least temporarily) uniquely identify the end-user device 52. The CPE 66 can provide a location request to a location client 70 that includes an identifier of the emergency services call. The location client 70 could be implemented, for example, as an ALI client or other client that is configured to interface with the location data source 68. The location request can be implemented as a request in the extended format, National Emergency Number Association (NENA) 04-001 (ALI Request) as bits on a wire, a network request (e.g., a TCP/IP) formatted message, etc. The location client 70 can be an interface for the location data source 68. In some examples, the location data source 68 and the location client 70 can be integrated on a single server, such as a server located at the PSAP 54. In other examples, the location client 70 can be physically separated from the location data source 68.

The location client 70 can forward the location request to the location data source 68. The location data source 68 can query the emergency gateway 60 for a location for the emergency services call. In response, in some examples, the emergency gateway 60 can provide a location corresponding to the selected location information. In other examples, the emergency gateway 60 can be configured to provide the location identified in the carrier location information to the location data source 68. In yet other examples, in response to the location request, the emergency gateway 60 can retrieve (e.g., query and receive) updated location information from the carrier location server 62 and/or the N number of supplemental location servers 63 (or some subset thereof). Additionally, the emergency gateway 60 select an updated location for the end-user device 52 in the operation described with respect to FIGS. 2-5 or by some other operation.

The location data source 68 can receive the location information from the emergency gateway 60 and forward the location information back to the location client 70. The location client 70 can forward the location information for the caller to the CPE 66. Alternatively, in some examples, a node on the PSAP 54 (such as the CPE 66) can provide a request for the updated location information to the emergency gateway 60. In this situation, the updated location request is handled by the emergency gateway 60 in a similar manner as an updated location request from the location data source 68, and the updated location information is returned to the PSAP 54. The CPE 66 can output text that characterizes the location information received from the location client 70 that can be read by the operator of the CPE 66.

Additionally, in situations where the emergency services call includes auxiliary data, the CPE 66 (or another component of the PSAP 54) can query the auxiliary data server 64 for auxiliary data. In response, the auxiliary data server 64 can return the auxiliary data for the emergency services call to the CPE 66 or another node in the PSAP 54. Additionally, the CPE 66 can output the auxiliary data for the operator of the CPE 66.

By employing the system 50, the emergency call initiated by the end-user device 52 can be routed to a particular PSAP 54 based on the supplemental location information in some situations. In particular, in some examples, such as densely populated urban areas, each PSAP may facilitate emergency services for a relatively small geographic area. In such a situation, the carrier location information may have a relatively poor precision and may cover geographic areas serviced by different PSAPs. However, by employment of the supplemental location provided from the N number of supplemental location servers 63 in addition to the carrier location information, the precision of the geographic area can be improved, while maintaining the accuracy of the carrier location information. In this manner, the emergency call can be routed to the appropriate PSAP 54 in a timely manner, which can improve response time for the dispatch of emergency services to an operator of the end-user device 52. Moreover, the emergency gateway 60 is agnostic to the particular location technology employed by each of the N number of supplemental location servers 63 and/or the carrier location server 62. Thus, as new location technologies emerge, the emergency gateway 60 can leverage resultant location information with little to no reconfiguration.

Figure 6:
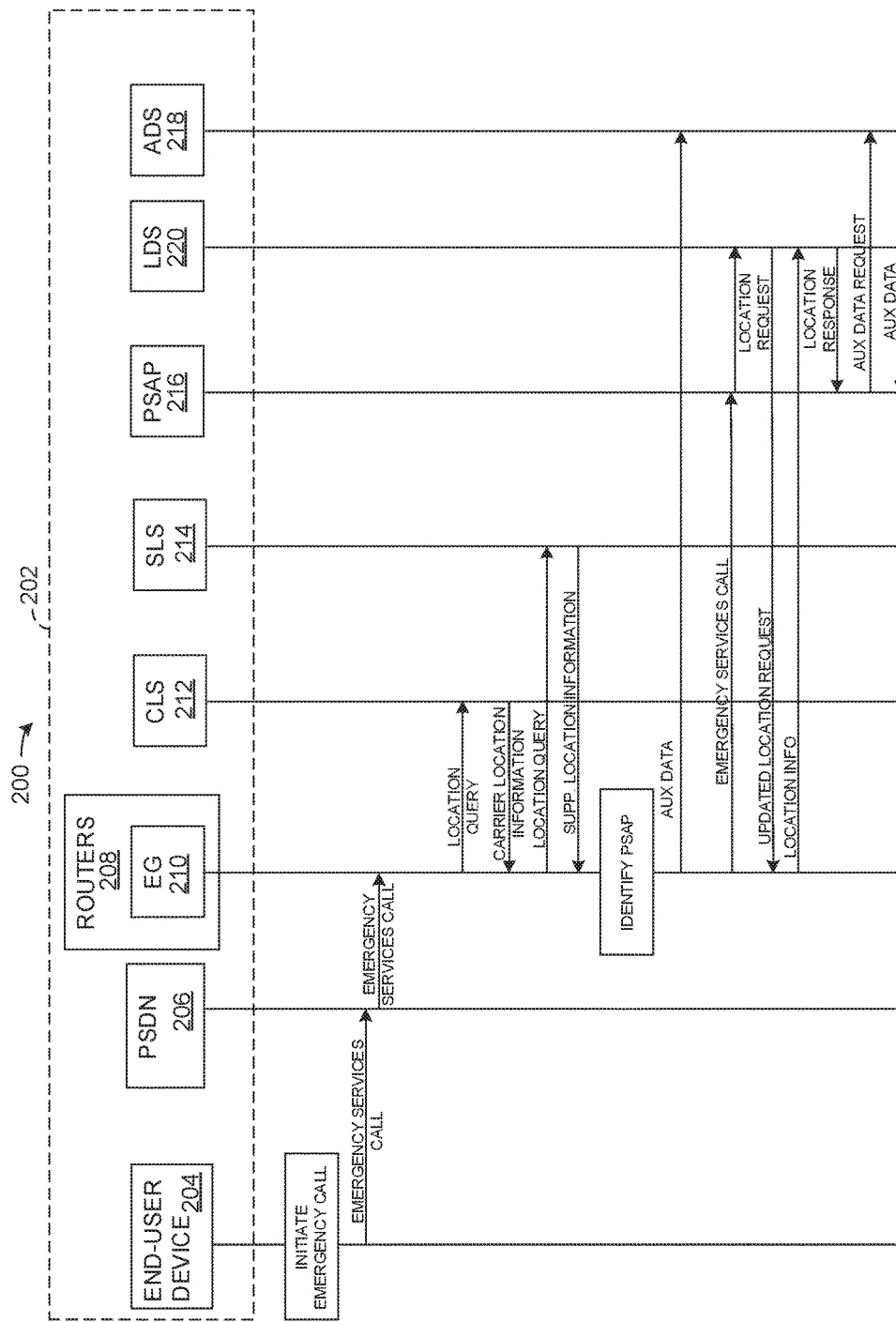
FIG. 6 illustrates an example of a timing diagram of a system configured to process an emergency services call.

FIG. 6 illustrates a timing diagram 200 for a system 202 to process an emergency services call. The system 200 can include nodes that communicate over a public network, such as the Internet, a private network, such as a wireless carrier network or a combination thereof. The system 202 can include an end-user device 204. The end-user device 204 can be implemented, for example, as a wireline phone, a VoIP phone, a wireless phone, etc. The end-user device 204 can be employed to implement the end-user device 52 illustrated in FIG. 1.

The end-user device 204 can be employed to initiate an emergency services call (e.g., a 9-1-1 voice or text call in North America). A user of the end-user device 204 can be referred to as a caller (of the emergency services call). The end-user device 204 can be connected with a PSDN 206 (primary service delivery node), which can be implemented as an MSC on a wireless subscriber network that communicates with the end-user device 204 or a VSP that communicates with the end-user device 204 on a TCP/IP network. The PSDN 206 can detect that the call is an emergency services call (e.g., by detecting that the call is directed to an emergency services contact center if the call has "9-1-1" digits). The PSDN 206 can process the emergency services call and route/forward the emergency services call to call routers 208. The routers 208 can be representative of telephony network components and/or Internet network components needed to route or provide routing information to connect the emergency services call to an appropriate call handling facility (e.g., a PSAP).

The emergency services call can be, for example, a voice 9-1-1 call, a 9-1-1 text (or short) message (e.g., a short message service (SMS) message or a multimedia service (MMS) message), etc. In examples where the emergency services call is a text message, the text message may include pictures and/or audio recordings, which may be referred to as auxiliary data. In such a situation, the indication from the PSDN 206 can include the auxiliary data.

The routers 208 can include an emergency gateway 110 (labeled in FIG. 6 as "EG") that can receive the emergency services call. In response to the notification of the emergency services call, the emergency gateway 210 can provide a location query to a carrier location server 112 (labeled in FIG. 6 as "CLS"). The carrier location server 112 can be employed to implement the carrier location server 62 illustrated in FIG. 1. The carrier location server 212 can return carrier location information (e.g., geographic coordinates, a cell sector/area and/or a civic address) of the end-user device 204 to the emergency gateway 210. The carrier location information can include a location and a precision. The precision characterizes an error radius of the location. It is presumed that the carrier location information is accurate. That is, it is presumed that the end-user device 204 is located within a geographic region defined by the location and precision (together). Additionally, in some examples, the carrier location information can include a timestamp.

Additionally, the emergency gateway 210 can provide a location query to a supplemental location server 114 (labeled in FIG. 6 as "SLS"). The supplemental location server 114 can be employed to implement an instance of the N number of supplemental location servers 63 in FIG. 1. Moreover, although only one (1) supplemental location server 214 is illustrated in FIG. 6, in other examples, the emergency gateway 210 can query more than one supplemental location servers 214.

The supplemental location server 214 operates independently of and externally to the carrier location server 212. The supplemental location server 214 can return supplemental location information to the emergency gateway 210. The supplemental location information can include a location (e.g., geographic co-ordinates or a civic address). In some examples, the supplemental location can include a precision (e.g., an error range) and/or a timestamp. In other examples, the emergency gateway 210 can assign the precision to the supplemental location information. Moreover, the timing diagram 200 illustrates the location query to the carrier location server 212 and carrier location information being provided to the emergency gateway prior to the location query to the supplemental location server 214. However, it is to be understood that in some examples, the location query to the carrier location server 212 and the location query to the supplemental location server 214 can execute concurrently and/or in a different order. Accordingly, the supplemental location information may be returned to the emergency gateway 60 prior to receipt of the carrier location information such as a time stamp of each instance of location information.

In response to receipt of both the carrier location information and the supplemental location information, the emergency gateway 210 can select location information from among the carrier location information and the supplemental location information. In some examples, such as those explained with respect to FIGS. 2-5, the emergency gateway can select the location information with the highest degree of accuracy and precision. In other examples, other factors can be employed for choosing the selected location information.

The emergency gateway 210 can provide the auxiliary data (if present) to an auxiliary data server 218. The emergency gateway 210 can employ the selected location information to identify a primary PSAP 216 (or other call center) to which to route the emergency services call. The emergency gateway 210 can forward the emergency services call to a selection router of the PSAP 216 based on the routing information.

In situations where the emergency call includes auxiliary data, the emergency gateway 210 can add call data and/or fields in packet headers of the forwarded emergency services call that indicates the presence of auxiliary data. Additionally, the PSAP 216 (e.g., via a trigger mechanism and a client) can send a location request to a location data source 220. In response to the location request, the location data source 220 can send a query for updated location information to the emergency gateway 210, and provide location information (labeled in FIG. 6 as "LOCATION INFO") to the location data source 220. In response, the location data source 220 can forward the location information in a location response to the PSAP 216 (labeled in FIG. 6 as "LOCATION RESPONSE"). In some examples, the emergency gateway 210 can provide the selected location information to the location data source 220. In other examples, the emergency gateway 210 can re-query the carrier location server 212 and/or the supplemental location server 214 for updated location information to provide as the location information to the location data source 220.

Additionally, in situations where the forwarded emergency services call includes an indication that auxiliary data is present for the emergency services call, the PSAP 216 can query the auxiliary data server 218 for the auxiliary data. In response, the auxiliary data server 218 can provide the auxiliary data to the PSAP 216.

The location information can be output at the PSAP 216 (e.g., at a CPE) for an operator. Additionally, in some examples, the auxiliary data (pictures, video and/or audio) can also be output at the PSAP 216.

Figure 7:
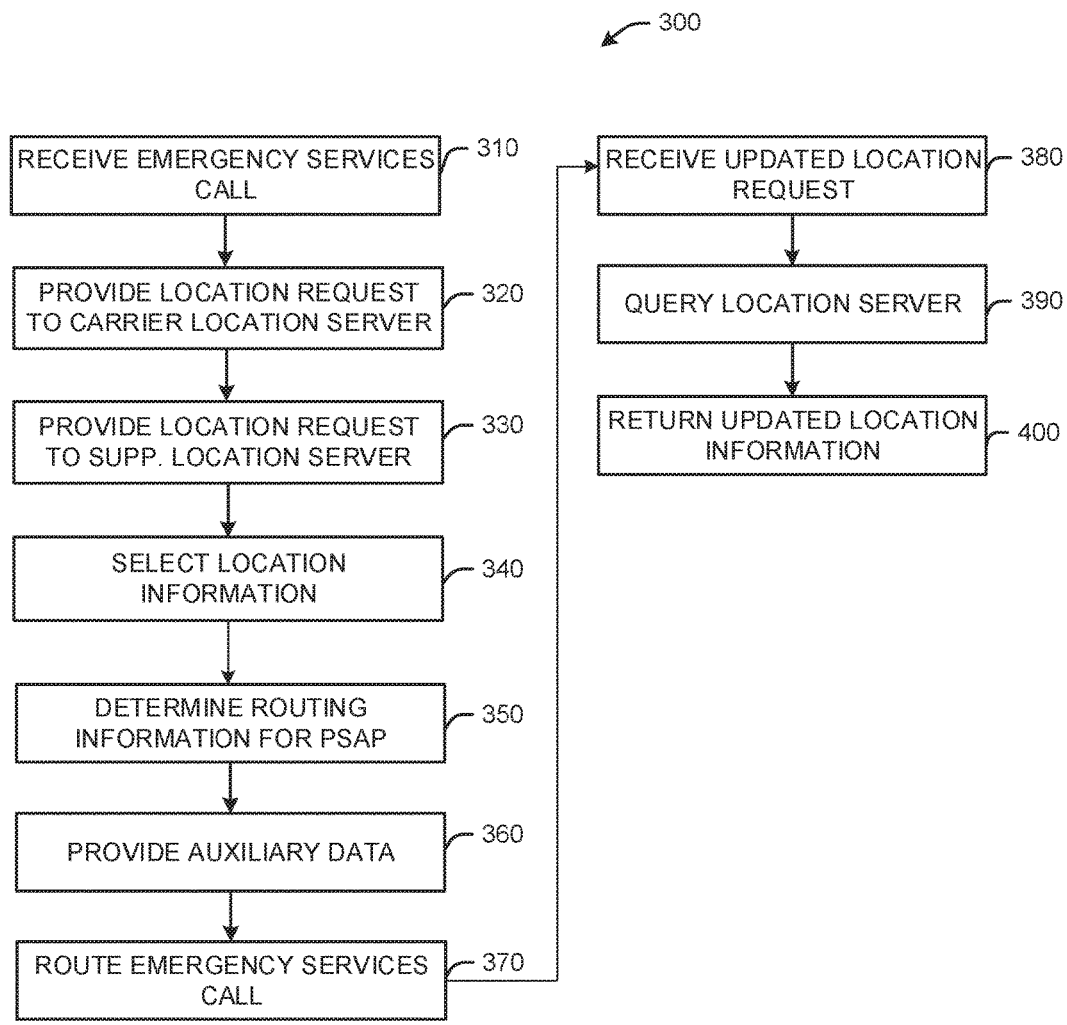
FIG. 7 illustrates a flowchart of an example method for processing an emergency services call.

In view of the foregoing structural and functional features described above, example methods will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 7 can be implemented as instructions stored in a non-transitory machine-readable medium. The instructions can be accessed by a processing resource (e.g., one or more processor cores) and executed to perform the methods disclosed herein.

FIG. 7 illustrates a flowchart of an example method 300 for generating ancillary data for an emergency services call. The method 300 can be implemented, for example, by the emergency gateway 60 of FIG. 1. The emergency services call can be made by a user (e.g., a caller) employing an end-user device (e.g., the end-user device 52 of FIG. 1). At 310, an emergency services call can be received at an emergency gateway (e.g., the emergency gateway 60 of FIG. 1). In some examples, the emergency services call can include auxiliary data (e.g., pictures, video and/or audio).

At 320, the emergency gateway can provide a location request for the end-user device to a carrier location server (e.g., the carrier location server 62 of FIG. 1), and the carrier location server returns carrier location information for the end-user device. At 330, the emergency gateway can provide a location request to N number of supplemental location servers (e.g., the N number of supplemental location servers 63), which location servers can return supplemental location information for the end-user device to the emergency gateway. At 340, the emergency gateway can select a particular instance of the carrier location information or the supplemental location information as "selected location information". The selection could be based, for example, on a comparison of the accuracy and precision of the carrier location information and the supplemental location information. At 350, the emergency gateway can determine routing information for a particular PSAP based on the selected location information. At 360, the emergency gateway can provide the auxiliary data to an auxiliary data server. At 370, the emergency gateway can route the emergency services call to the selected PSAP.

At 380, the emergency gateway can receive an updated location request for the end-user device. The updated location request could be provided from a requesting node. The requesting node could be a service or the PSAP identified in the routing information. At 390, the emergency gateway can query a location server (or multiple location servers) for an updated (current) location of the end-user device, and the location server can return the updated location information to the emergency gateway. At 400, the emergency gateway can return (provide) the updated location information to the requesting node.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An emergency gateway comprising one or more computing devices that:
   receives carrier location information from a carrier location server for an end-user device that initiated an emergency services call;
   receives supplemental location information for the end-user device from a supplemental location server;
   selects one of the carrier location information and the supplemental location information based on a comparison of an accuracy and precision of the carrier location information and the supplemental location information, wherein the selected information is the supplemental location information based on a determination that a location identified by the supplemental location information is inside an area defined by the carrier location information and that the supplemental location information is more precise than the carrier location information;
   generates routing information for the emergency services call based on the selected location information, wherein the routing information identifies a given Public Safety Answering Point (PSAP) for the emergency services call; and
   routes the emergency services call to the given PSAP based on the routing information.

2. The emergency gateway of claim 1, wherein the emergency gateway receives the emergency services call from a primary service delivery node (PSDN) in communication with the end-user device.

3. The emergency gateway of claim 2, wherein the notification includes ancillary data comprising at least one of a picture, video and audio for the emergency services call.

4. The emergency gateway of claim 2, wherein the emergency services gateway provides the ancillary data to an ancillary data server.

5. The emergency gateway of claim 1, wherein the supplemental location server operates independent from the carrier location server.

6. The emergency gateway of claim 5, wherein the carrier location information is derived based on triangulation of base stations on a carrier network that communicates with the end-user device.

7. The emergency gateway of claim 6, wherein the supplemental location information is based on at least one of a location of a WiFi router and a Bluetooth hotspot that communicates with the end-user device.

8. The emergency gateway of claim 6, wherein the supplemental location information is based on a global navigation satellite system (GNSS) location derived at the end-user device.

9. The emergency gateway of claim 1, wherein the emergency gateway comprises a Next Generation 9-1-1 (NG-9-1-1) node.

10. The emergency gateway of claim 1, wherein the carrier location server is a Serving Mobile Location Center (SMLC).

11. The emergency gateway of claim 1, wherein the emergency gateway comprises an emergency routing services (ERS) node and the end-user device is a mobile phone.

12. The emergency gateway of claim 1, wherein the emergency gateway comprises an emergency routing services (ERS) node and the end-user device is a Voice over Internet Protocol (VoIP) phone.

13. The emergency gateway of claim 1, wherein the emergency gateway provides the selected information to a requesting node.

14. The emergency gateway of claim 13, wherein the requesting node is a location data source or the given PSAP.

15. The emergency gateway of claim 1, wherein the supplemental location server is a given supplemental location server, and the emergency services gateway queries another supplemental location server for location information for the end-user device.

16. A system comprising:
   an emergency gateway comprising one or more computing devices that:
      queries a carrier location server for carrier location information for the end-user device response to receiving an emergency services call initiated by a caller employing an end-user device, wherein the carrier location information characterizes a cell sector for the end-user device;
      queries a supplemental location server for supplemental location information for the end-user device, wherein the supplemental location characterizes geographical coordinates of the end-user device and a precision of the supplemental location information;

selects one of the carrier location information and the supplemental location information, wherein the selecting is based on a comparison of an accuracy and a precision of a carrier location information area defined by the carrier location information and a supplemental location area defined by the supplemental location information, wherein the selected information is the supplemental location information based on a determination that a location identified by the supplemental location information is inside an area defined by the carrier location information and that the supplemental location information is more precise than the carrier location information;

determines routing information for the emergency services call based on the selected location information, wherein the routing information identifies a given Public Safety Answering Point (PSAP); and forwards the emergency services call to the given PSAP.

17. The system of claim 16, wherein the emergency services call is a short message that includes auxiliary data comprising text and at least one of a picture, video and audio, the system further comprising:

an auxiliary data server comprising one or more computing devices that stores auxiliary data for the emergency services call based on an identifier of the emergency services call; and wherein the emergency gateway provides the auxiliary data to the auxiliary server.

18. The system of claim 16, wherein the comparison includes determining if the supplemental location information area that does not overlap the carrier location information area exceeds a predetermined portion the carrier location information area.

19. A method comprising:

receiving an emergency services call by an end-user device from a primary service delivery node (PSDN) of the end-user device;

querying a carrier location server for carrier location information for the end-user device;

querying a supplemental location server for supplemental location information for the end-user device; and selecting one of the carrier location information and the supplemental location information for the emergency services call based on a comparison of an accuracy and precision of each of the carrier location information and the supplemental location information, wherein the comparison includes determining if a portion of a supplemental location information area defined by the supplemental location information that does not overlap a carrier location area defined by the carrier location information exceeds a predetermined portion the carrier location information area.

* * * * *